United States Patent [19]

Pavlopoulos

[11] 4,022,602
[45] May 10, 1977

[54] METHOD OF FABRICATING LOW-LOSS CHANNEL OPTICAL WAVEGUIDES

[75] Inventor: Theodore G. Pavlopoulos, San Diego, Calif.

[73] Assignee: The United States of America as represented by the Secretary of the Navy, Washington, D.C.

[22] Filed: Oct. 30, 1975

[21] Appl. No.: 627,495

[52] U.S. Cl. ............................ 65/102; 65/2; 65/DIG. 4; 65/DIG. 7; 264/1; 313/95; 350/96 WG

[51] Int. Cl.² ...................... G02B 5/14; C03B 32/00

[58] Field of Search .......... 65/2, 4 R, 18, DIG. 7, 65/64, 102, 111, DIG. 4; 350/96 WG; 313/95 R; 264/1

[56] References Cited

UNITED STATES PATENTS

| | | | |
|---|---|---|---|
| 3,542,536 | 11/1970 | Flam et al. | 65/4 B X |
| 3,756,799 | 10/1973 | Neuroth | 65/18 |
| 3,912,478 | 10/1975 | Presby | 65/DIG. 7 |

*Primary Examiner*—Robert L. Lindsay, Jr.
*Attorney, Agent, or Firm*—R. S. Sciascia; G. J. Rubens; J. W. McLaren

[57] ABSTRACT

A material is selected which is capable of propagating light energy and is also highly absorptive of light energy within a determinable wavelength region. A laser beam which includes such wavelength region in its output energy is focused on the surface of the selected material in a sufficent concentration to cause partial evaporation of its surface and relative linear movement is given effect between the laser beam focal point and the selected material in a focal plane of the laser beam. The rate of such relative linear movement is controlled to produce grooves in the surface of the selector material by absorption of laser energy, thereby defining optical waveguide guiding paths immediately beneath the grooves due to localized change of index of refraction.

4 Claims, 1 Drawing Figure

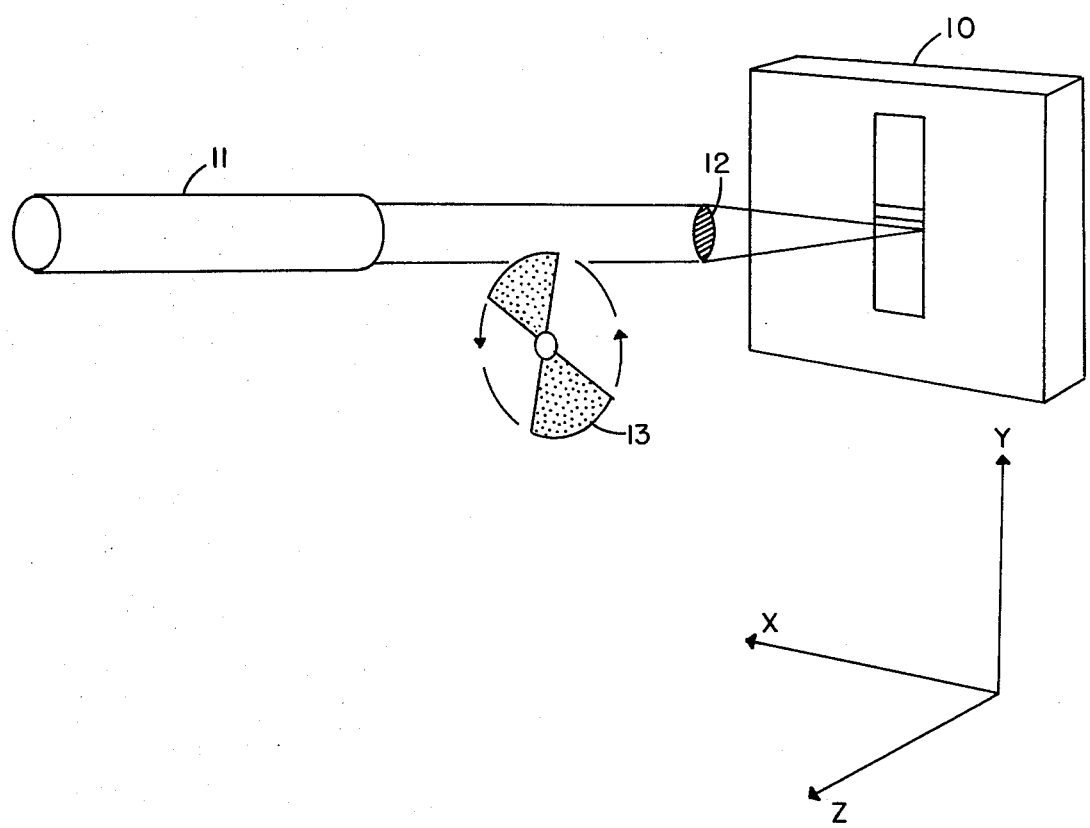

METHOD OF FABRICATING LOW-LOSS CHANNEL OPTICAL WAVEGUIDES

BACKGROUND OF THE INVENTION

The advantages and desirability of integrated optical devices is generally recognized, though their development is still in its early stages. The practical application of such integrated optics devices depends to a large extent on devising convenient methods for producing single mode channel waveguides which confine a beam of light energy in two dimensions. One major problem in the fabrication of such general optical waveguides arises from the extremely small size of the channel optical waveguide and also its very stringent dimensional tolerance. For example, the width of a single mode optical channel waveguide must generally be of the order of a wavelength of the light energy to be propagated and the wall roughness of the optical waveguide must generally be less than the order of one-tenth of a wavelength of such light energy in order to satisfactorily minimize light losses.

A number of prior art methods have been employed to produce such channel optical waveguides. For example, ion bombardment of fuzed quartz is one of the earliest methods for producing two dimension confinement of light energy within a material. This type of prior art technique was disclosed by E. R. Schineller, R. P. Flam, and D. W. Wilmet in Volume 58 of the Journal of the Optical Society of America at page 1171.

A more recent technique involving ion implantation in semiconductors was disclosed by E. Garmire, H. Stoll, A. Yariv, and R. G. Humperger in Volume 21 of Applied Physics Letters at page 28.

Another prior art method of fabricating such channel optical waveguides involved grooves which were embossed in a plastic material with the aid of a wire. The grooves were filled with polymethylmethacrylate which was later polymerized. This process forms polymeric channel waveguides as disclosed by R. Ulrich, H. P. Weber, E. A. Chandress, W. J. Tomlinson and E. A. Franke in Volume 20 of Applied Physics Letters at page 213.

Photolithographic techniques were also employed in the prior art to fabricate optical waveguide structures in semiconductors as reported by H. F. Taylor, W. E. Martin, D. B. Hall and V. N. Smiley in Volume 21 of Applied Physics Letters at page 95 and also by W. E. Martin and D. B. Hall in Volume 21 of Applied Physics Letters at page 325. In the employment of such prior art techniques, changes in the refractive index $n$ of the waveguide are achieved by a diffusion process. Stated in its most simple context, for example, the index of refraction $n$ of ZnSe may be increased by diffusing CdSe into it, since the index of refraction of ZnSe is less than the index of refraction of CdSe. Desirably this prior art method produces channel optical waveguides which exhibit relatively low-loss characteristics.

Another prior technique involves electro chemically induced migration of ions into glass to fabricate channel optical waveguides as disclosed and reported by T. Izawa and H. Makagome in Volume 21 of Applied Physics Letters on page 584.

Even more recently a prior art method of fabricating low-loss channel optical waveguides has been devised employing the technique of "photo locking" as disclosed and reported by E. A. Chandress, C. A. Pryde, W. J. Tomlinson, and H. P. Weber in Volume 24 of Applied Physics Letters at page 72. In the employment of this latter technique, channel optical waveguides four microns wide were produced by writing with the 364 nanometer line of a continuous-wave, argon ion laser on a polymer film having a methylmethacrylate base and doped with two-(1-mapthythl) acylate. The laser exposure selectively increases the index of refraction of the doped polymer. A photochemical reaction links the dopant to the polymer and also contributes to dopant dimerization and related chemical reactions. The films are then annealed by heating, which also removes the dopant in the unexposed parts of the film.

Accordingly, though considerable success has been achieved in developing methods for the fabrication of single mode low-loss channel optical waveguides, it is highly desirable that improved methods involving simpler processes be devised which will produce extremely narrow width channel optical waveguides with a high degree of accuracy and minimizing wall roughness of the optical waveguide to enhance its low-loss character.

SUMMARY OF THE INVENTION

The concept of the present invention contemplates a method for fabricating low-loss channel optical waveguides which initially involves the selection of a suitable material which is not only capable of propagating light energy but is also highly absorptive of light energy within a known or determinable wavelength region. Such material may comprise a suitable color filter glass, a number of which are readily obtainable from commercial sources, for example. These filter glasses not only are capable of propagating the desired light energy, but are also highly absorptive of light energy within a determinable wavelength region depending upon the particular wavelength regions which they are designed to filter.

The selected material such as the color filter glass is mounted on an assembly which provides three translations stages to develop precision motion in X, Y and Z directions. A source of laser energy in the form of a laser beam, including the wavelength region in which the selective material is highly absorptive, is provided and the translation stage for the Z direction is employed to focus the laser beam on the surface of the selected material in sufficient concentration to cause partial evaporation of its surface.

Relative linear movement between the laser beam focal point and the selected material may be given effect in two directions of the focal plane of the laser beam by the X and Y translation stages. Thus, movement perpendicular to the focused laser beam is provided and straight grooves may be produced in the selected material by translating the selected material in the X or the Y direction, for example. The rate of such relative linear movement is controlled to produce the grooves of the surface selected material by absorption of the laser energy thus defining optical waveguiding paths immediately beneath the grooves.

The Y translation stage permits movement of the selected material up or down in the focal plane of the laser beam in order to fabricate parallel grooves providing parallel optical wire waveguides for example, with a high degree of accuracy. Coordination of movement in both the X and Y directions makes it possible to fabricate optical waveguides having bends and related structures.

Accordingly, it is an object of the present invention to provide a simplified and improved method of fabricating low-loss channel optical waveguides.

A concomitant object of the present invention is to provide a method for fabricating low-loss channel optical waveguides of extremely narrow width and with a high degree of accuracy to minimize light energy losses.

A further object of the present invention is to provide an improved method of fabricating low-loss channel optical waveguides having minimal wall roughness along the length of the optical waveguide to minimize light energy losses.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWING

The drawing is an illustration of equipment which may be employed in the practice of the method of the present invention to fabricate low-loss channel optical waveguides.

DESCRIPTION OF THE METHOD OF THE PRESENT INVENTION

The present invention contemplates the selection of a suitable material which is not only capable of propagating light energy, but is also highly absorptive of light energy within a determinable or known wavelength region. In the practice of the present invention, a typical selection which was found to be satisfactory was a 1 mm thick glass filter of the OG 550JENA color filter type, 2 × ¼ inch in size. Other color filter glass may be employed such as OG 530, OB 570, OG 590, RG 610 and RG 630, all of which absorb light energy in the 448 nanometer region very strongly.

The selected material, which is represented as element 10 in the drawing, may be mounted in a suitable assembly (not shown) to provide three translation stages for giving effect to precision movement orthogonally in the X, Y and Z directions as represented in the drawing. Movement of the selected material 10 was accomplished in one instance by connecting the differential screw of the translational stage to a variable speed electric motor with the aid of a flexible cable. The motor was varied in speed between 0 and 17 rpm which produced a translation speed of from 0 to 270 $\mu$m/sec. Other suitable motors may be operable between 0 and 96 rpm corresponding to translation movement of the selected material from 0 to 1700 $\mu$m/sec. In experimentation, the Y translation stage was a precision stage available commercially which allowed manually moving the selected material 10 up or down to fabricate parallel grooves. One typical commercially available translation stage had an accuracy of 0.13 $\mu$m/DIV. and was adaptable to attach a suitable electric motor drive.

A laser energy source 11 which produces an output including the absorptive wavelength region of the selected material 10 is positioned as shown in the drawing. In one example of the practice of the present invention, a commercially available Spectra Physics, Model 164, argon ion cw laser was employed. Its output laser energy was focused with the aid of a 21 power Bausch and Lomb microscopic objective schematically represented as element 12 of the drawing.

The laser beam, including the absorptive wavelengths region of the selected material 10, had its output focused on the surface of the selected material 10 in sufficient concentration to cause partial evaporation of its surface. At the same time relative linear movement between the laser beam focal point and the selected material 10 was caused by the translational stage in the X direction. The rate of such relative linear movement was controlled to produce grooves on the surface of the selected material 10 by absorption of laser energy, defining optical waveguiding paths immediately beneath the grooves which are believed are due to localized change of index of refraction.

In the practice of the present invention, proper focusing of the laser beam on the surface of the selected material for writing the small grooves desired may present difficulties. For example, rough focusing approximating the desired focal result may be assumed to be present when maximum reflection of laser light is observed from the surface of the sample. However, the fine focusing which is necessary for the preferred practice of the method of the present invention probably is best accomplished by trial and error. The smallest grooves produced in one example of practice of the present invention were about two microns wide. It has been found however, that only the beginning or end of such a narrow groove would sustain discernable waveguiding in the selected material and therefore the optical waveguiding properties of extremely narrow grooves of the order of two microns wide were found not to be altogether satisfactory. It was found, however, that grooves wider than three microns possessed excellent optical waveguiding qualities and were consistently reproducable with the previously described arrangement of equipment in the practice of the method of the present invention.

In the practice of the method of the present invention it has been found that a low-loss channel optical waveguide about four microns wide may be produced with approximately 320 milliwatts of power employing the laser described in connection with the description of the equipment illustrated in the drawing and by translating the selected material at a speed of 0.5 mm/sec. Such channel optical waveguides fabricated in accordance with the teaching of the method of the present invention readily propagated energy from light source of a helium neon cw laser beam.

Examination of the optical waveguiding channel fabricated in accordance with the method of the present invention (when viewed from the top with the aid of a microscope) indicated no scattered light line which confirmed that scattering losses were desirably very low. Moreover, this low loss property, indicating very smooth edges of the grooves fabricated in accordance with the teaching of the method of the present invention, is probably due to the thermal origin.

Although the precise causation of the channel optical waveguiding paths which are created beneath grooves made in a suitable material by the application of a sharply focused laser beam is not entirely known, greatly enlarged photographs of such grooves and microscopic inspection has revealed several interesting aspects. It may be be visually observed that the grooves themselves have no surface ridges which would suggest that some of the selected material has disappeared. This, in turn, leads to the probable conclusion that the temperature created at the focal point of a laser beam due to the strong absorption by the selected material is sufficiently high to evaporate some of the material from its surface.

Additionally, around the grooves created by the application of the sharply focused laser beam and most especially under the grooves a considerable change in shade was evident in the selected color filter material employed in initial experimentation with the method of fabrication of the present invention. Such change in shade would appear to indicate a change in the index of refraction of the selected material in that area. It, of course, may be reasonably concluded that the optical waveguiding effect which is produced immediately below the channels fabricated in accordance with the teaching and method of the present invention results from a localized increase of the index of refraction of the selected material.

Since heat generates strain in many materials and in most glasses such as the color filter material which was selected for experimentation of the practice of the method of the present invention, it may be concluded that the resultant strain leads to a change in refractive index. In practicing the present invention the selected material was a type of filter colored glass which obtained its color from dissolved metal oxides. Additionally, the high temperature created at the focal point of the laser beam might also cause some composition changes in glass which can contribute to the change in refractive index of a selected glass material.

Finally, the high electric fields present at the laser beam focal point could also have the type of polarization effect which could contribute to changes in refractive index. Also, notably, it was observed that grooves created in the practice of the method of the present invention were rather deep relative to their width.

Additionally, the concept of the method of the present invention is such that it is adaptable to the fabrication of waveguides with corrugations, i.e., periodically varying thickness by the partial insertion of a mechanical chopper 13 into the laser beam as shown in the drawing.

Accordingly, the present invention provides a greatly simplified method as compared to prior art practices of fabricating low-loss channel optical paths which is simple, effective and accurate producing optical waveguiding paths of extremely small dimensions to a very high degree of accuracy.

Obviously many modifications and variations of the present invention are possible in the light of the above teachings. It is therefore to be understood that within the scope of the appended claims the invention may be practiced otherwise than as specifically described.

What is claimed is:

1. A method of fabricating low-loss channel optical waveguides comprising:
    selecting a color filter glass material highly absorptive of light energy within a determinable color filter wavelength region and highly transmissive of substantially all other wavelengths of light energy;
    focusing a laser beam emitting light energy including said color filter wavelength region on a planar surface of the selected material in sufficient concentration to cause partial evaporation of its surface;
    causing relative linear movement between the laser beam focal point and the selected color filter glass material in the focal plane of the laser beam; and
    controlling the rate of such relative linear movement to produce grooves in the surface of the selected color filter glass material by absorption of laser energy within said color filter wavelength region, defining optical waveguiding paths immediately beneath the grooves due to resultant localized change of index of refraction.

2. A method of fabricating low-loss channel optical waveguides as claimed in claim 1 wherein the selected material is moved relative to a stationary laser beam.

3. A method of fabricating low-loss channel optical waveguides as claimed in claim 1 wherein said laser beam is of the continuous wave type.

4. A method of fabricating low-loss channel optical waveguides as claimed in claim 1 wherein said laser beam is comprised of energy principally in the 488 nanometer wavelength region of a continuous wave argon ion laser.

* * * * *